(No Model.) 2 Sheets—Sheet 1.
G. A. JOY.
HEADER ATTACHMENT FOR HARVESTERS AND BINDERS.
No. 411,993. Patented Oct. 1, 1889.
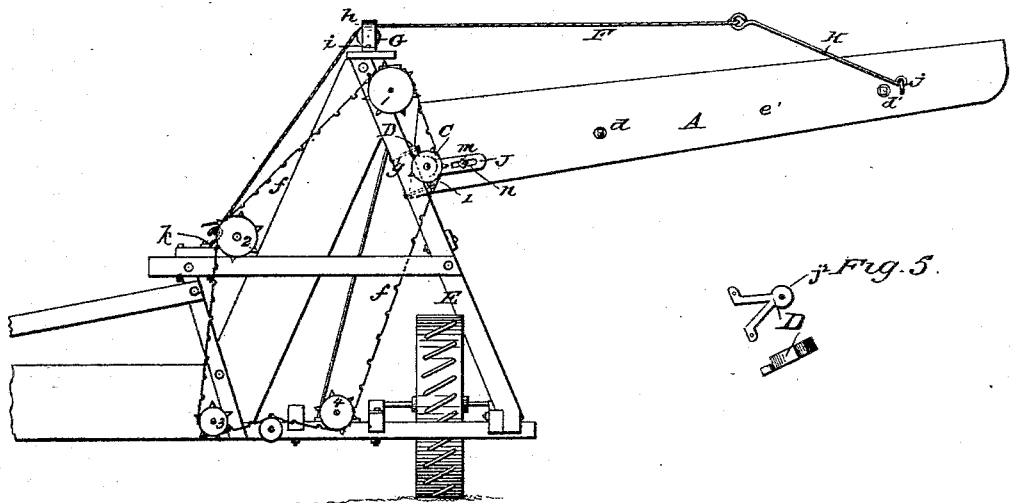
WITNESSES:
Fred G. Dieterich
P. B. Turpin
INVENTOR:
George A. Joy
BY
ATTORNEYS.

(No Model.) 2 Sheets—Sheet 2.
G. A. JOY.
HEADER ATTACHMENT FOR HARVESTERS AND BINDERS.
No. 411,993. Patented Oct. 1, 1889.
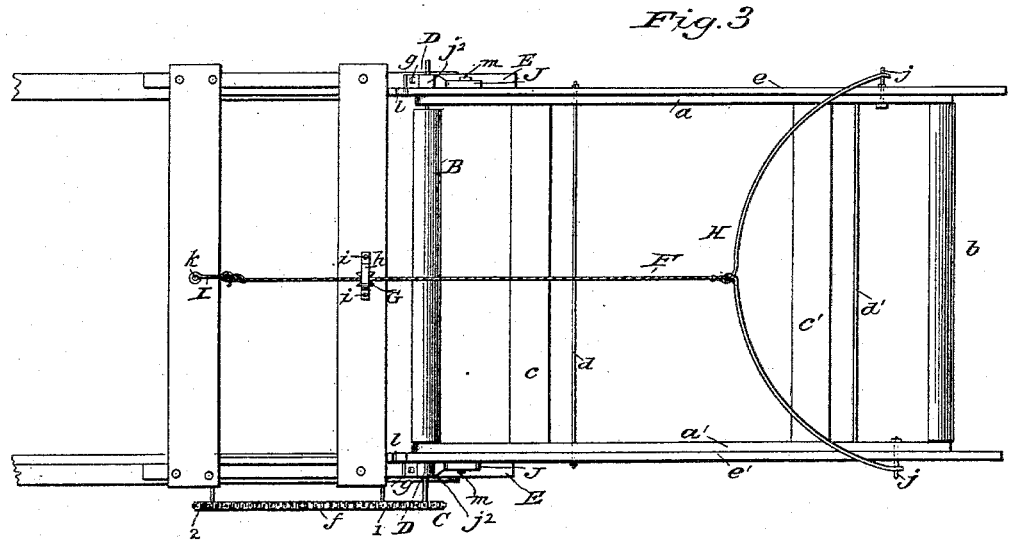
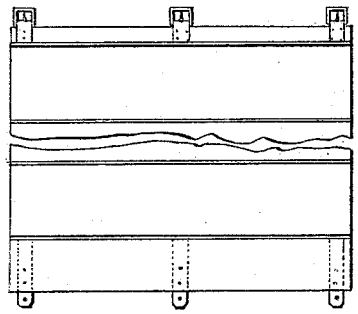
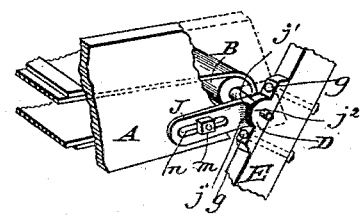
WITNESSES:
Fred G. Dieterich
P. B. Turpin
INVENTOR:
George A. Joy
BY Munn &Co
ATTORNEYS.

UNITED STATES PATENT OFFICE.

GEORGE A. JOY, OF BISMARCK, DAKOTA TERRITORY.

HEADER ATTACHMENT FOR HARVESTERS AND BINDERS.

SPECIFICATION forming part of Letters Patent No. 411,993, dated October 1, 1889.

Application filed August 16, 1886. Serial No. 211,084. (No model.)

*To all whom it may concern:*

Be it known that I, GEORGE A. JOY, a citizen of the United States, residing at Bismarck, in Burleigh county, Dakota Territory, have invented a certain new and useful attachment—viz., a Header Attachment for Harvesters—of which the following is a specification.

The objects of my invention are, first, to convert any harvester and binder into a most economical header by removing the binder attachment which is on all harvesters and binders and attaching in the place thereof my header attachment; second, to avoid the necessity of the average farmer purchasing two machines—namely, a harverster and binder and also a header—and enable him in ten minutes time to convert his harvester and binder into a most complete header; third, to enable the farmer to harvest in the most economical manner all short grain and grain that is overripe, and where there is a heavy growth of straw it enables the farmer to save the grain by cutting off the heads and leaving the straw on the ground as a fertilizer for the next crop.

My said invention and the manner of attaching the same to harvesters and binders is more fully described and illustrated in and by the accompanying drawings, in which—

Figure 1 represents a rear elevation of a portion of a harvester and binder with the binding attachment removed and the header attachment in its place. Fig. 2 represents a section through the middle of a portion of a harvester and binder with the binding attachment removed and the header attachment in its place. Fig. 3 represents a top plan view of a portion of a harvester and binder with the binding attachment removed and the header attachment in its place. Fig. 4 is a detail view of the draper. Fig. 5 represents a modification of a bearing-bracket for supporting the inner or lower roller of the header attachment, to be used in place of the bracket D when the construction of the harvester renders it inconvenient to use the latter; and Fig. 6 is a detail view illustrating the connection of the header attachment with the harvester-frame.

Similar letters refer to similar parts throughout the several views.

Frame A consists of two side-boards $e\ e'$, the two cleats or slide-bars $a\ a'$, the two cross-braces $c\ c'$, the two tie-rods $d\ d'$, the two eye-bolts $j\ j$, and the lower and upper rollers B $b$. The side-boards $e\ e'$ are bolted, respectively, to the cleats $a\ a'$. The two cross-braces $c\ c'$ are mortised into the cleats $a\ a'$, and then the two sides of frame are firmly drawn and held together by the two tie-rods $d\ d'$, as shown in Fig. 3. The roller B is made of hard wood, with a small iron shaft extending through the same. This shaft extends beyond the ends of the roller and serves as an axle for the same, and to one end of this shaft a sprocket-wheel C is fastened, as shown in Figs. 1 and 3. The roller B is separate from the frame A and journaled in the two bearing-brackets D D, which are bolted each with two bolts $g\ g$ to the struts of the elevator-frame of the harvester, as represented by E in Figs. 1, 2, and 3. The side-boards of the frame A are provided with slots $l\ l$ at the end toward the harvester. The slots $l\ l$ straddle that portion of the shaft of roller B which is between the brackets D D and the ends of the roller B. The castings J J, which are attached to the outer sides of the side-boards $e\ e'$ at their slotted ends by the bolts $m\ m$, passing through the slotted openings $n\ n$, have one of their ends concaved at $j'$ to form a bearing against the outer convex surface $j^2$ of the bearing-brackets D D and serve to support the weight of the draper-frame independently of the inner shaft and thereby prevent the frame A from resting against the shaft of the roller B and causing friction therewith. Also, by adjusting these castings or plates J J longitudinally along the side-boards the draper or apron may be tightened or slackened, as desired. The bolts $m\ m$ serve to secure the plates J J in any desired adjustment. The upper or outer roller $b$ is supported in bearings in the upper or outer ends of side-boards $e\ e'$ of the frame A. A canvas apron is buckled around the rollers B $b$, and is operated by motion imparted from the roller B, which in turn receives its motion from the axle of the drive-wheel through the medium of the sprockets 1, 2, 3, 4, and C and the sprocket-chain $f$. The sprocket 4, it will be understood, may be geared in any suitable manner with the axle of the drive-wheel, as will be obvious to those skilled in the art. Wire bail H, having a loop in the middle, is hooked at its ends to the eyes of eyebolts j j, inserted in the sides of the frame A near its outer end.

I represents an iron hook, which is bolted to seat-board of harvester by bolt k.

G is a small pulley-sheave mounted in a bracket-bearing h, secured to the top of the A-frame of the harvester by the bolts i i.

F is an adjusting-cord fastened at one end to the center of the bail H, thence extending over the pulley G to the hook I, to which it is secured by tying or in other suitable manner.

The draper-frame A is raised and lowered to suit convenience by drawing in and letting out cord F, as can be seen in Figs. 1 and 2.

In operation it will be understood that the cut material is delivered by the platform-carrier of the harvester to the elevator thereof, and is raised and discharged by the latter to the binding attachment or to the header attachment, as the case may be. As such platform-carrier and elevator are common features of harvesters, it does not seem necessary to illustrate them or their operating devices in detail, as they are well known in the art. I have therefore simply shown such devices in a diagrammatic manner in Fig. 2 in order to more clearly disclose my improvements. The bearing-brackets and the roller B are removed when the machine is converted into a binder, and are replaced when it is desired to convert the machine from a binder to a header.

It will be understood that my invention is applicable to any of the ordinary binders, it being necessary in order to convert a binder to a header only to remove the entire binding mechanism, (which may be of any of the ordinary forms,) then to apply the header attachment, as shown. In so doing after the binding mechanism is removed I secure the brackets D to the frame with the roller B properly in place in said brackets. A sufficient number of links are then added to chain f to enable it to properly engage the wheel C, and the rest of the devices forming my improvement are set to position, as before described. When the header attachment is removed, it is only necessary to remove as many of the links from the chain as have been added to the chain f, when such chain will serve properly to drive the binding mechanism.

The machine can be changed from a low cut as used in binders to a high cut as used in headers by means of any of the well-known mechanisms employed for such purpose. It may, for instance, be the rack mechanism E', as indicated in Fig. 2.

Having described my invention, what I desire to claim and secure by Letters Patent is—

1. A header attachment substantially as described and shown, consisting of the draper-frame having side-boards provided in one end with slots extended in the direction of their length, the inner roller having its trunnions passed through said slots, whereby the said roller may be adjusted to tighten the draper, the outer roller, the draper, the brackets having bearings for the trunnions of the inner roller, and the plates J J, connected adjustably with the side bars of the draper-frame and arranged to engage the brackets, all substantially as and for the purposes specified.

2. The combination of the harvester-frame, the brackets D, secured thereto, the inner draper-roller having its trunnions journaled in said brackets, the draper-frame having side bars provided in their inner ends with slots passed over the trunnions of the inner roller, the outer roller, the draper, and the plates J J, secured to and adjustable along the draper-frame, said plates being arranged to bear at their inner ends against the brackets, whereby by the adjustment of said plates the draper may be tightened and the weight of the draper-frame may be supported independent of its inner shaft, substantially as set forth.

3. The combination of the harvester-frame, the bearing-brackets having a convex surface, the draper-frame having slots l l, the inner and outer rollers, the draper, the plates J J, having slots n n, and having their inner ends concaved and conformed to the convex surface of the bearing-brackets, and the bolts passed through the slots n n into the draper-frame, substantially as set forth.

4. The combination of the A-frame, the pulley G, the hook I, connected therewith, the bearing-brackets D D, having convex surfaces, the draper-frame having slots l l, the rollers B b, the draper supported thereon, the plates J J, slotted and having concaved ends, the bolts m m, the bail H, and the adjusting-cord connected therewith and extended over pulley G and secured to hook I, substantially as set forth.

GEORGE A. JOY.

Witnesses:
A. R. AVERY,
H. J. LOWRY.